United States Patent
Holland

(10) Patent No.: US 10,539,740 B2
(45) Date of Patent: Jan. 21, 2020

(54) OPTICAL COMBINER

(71) Applicant: OFS Fitel, LLC, Norcross, GA (US)

(72) Inventor: William R Holland, Upper Black Eddy, PA (US)

(73) Assignee: OFS FITEL, LLC

( * ) Notice: Subject to any disclaimer, the term of this patent is extended or adjusted under 35 U.S.C. 154(b) by 824 days.

(21) Appl. No.: 14/601,701

(22) Filed: Jan. 21, 2015

(65) Prior Publication Data
US 2016/0209592 A1    Jul. 21, 2016

(51) Int. Cl.
*G02B 6/04* (2006.01)
*G02B 6/14* (2006.01)
*G02B 6/28* (2006.01)

(52) U.S. Cl.
CPC ............. *G02B 6/04* (2013.01); *G02B 6/2856* (2013.01); *G02B 6/14* (2013.01)

(58) Field of Classification Search
None
See application file for complete search history.

(56) References Cited

U.S. PATENT DOCUMENTS

| | | | | |
|---|---|---|---|---|
| 2,825,260 A | * | 3/1958 | O'Brien | G02B 6/06 250/483.1 |
| 3,188,188 A | * | 6/1965 | Norton | C03B 37/10 116/DIG. 36 |
| 3,912,362 A | * | 10/1975 | Hudson | G02B 6/403 385/115 |
| 4,179,185 A | * | 12/1979 | Hawk | G02B 6/2856 385/43 |
| 4,952,022 A | * | 8/1990 | Genovese | G02B 6/0008 156/169 |
| 4,986,620 A | * | 1/1991 | Severijns | C03B 37/028 385/147 |
| RE33,722 E | * | 10/1991 | Scifres | G02B 6/2552 385/115 |
| 5,508,513 A | * | 4/1996 | Genovese | G02B 6/241 250/227.26 |
| 5,838,865 A | * | 11/1998 | Gulick | G02B 6/06 348/E5.141 |
| 6,219,480 B1 | * | 4/2001 | Cassarly | G02B 6/2804 385/31 |
| 6,272,155 B1 | * | 8/2001 | Sekiguchi | G02B 6/06 372/6 |
| 6,385,371 B1 | * | 5/2002 | Li | G02B 6/2804 385/121 |
| 6,614,972 B1 | * | 9/2003 | Lundin | G02B 6/0005 385/115 |
| 6,618,530 B1 | * | 9/2003 | Lundin | G02B 6/0005 385/119 |
| 7,532,792 B2 | * | 5/2009 | Skovgaard | G02B 6/02376 385/24 |
| 7,720,340 B2 | * | 5/2010 | Lewis | G02B 6/2804 156/166 |

\* cited by examiner

*Primary Examiner* — Michelle R Connelly
(74) *Attorney, Agent, or Firm* — Sam S. Han, Esq.

(57) ABSTRACT

A waveguide comprises an un-tapered end and a tapered end. The waveguide progressively varies a numerical aperture (NA) of light as the light propagates from the tapered end to the un-tapered end.

15 Claims, 1 Drawing Sheet

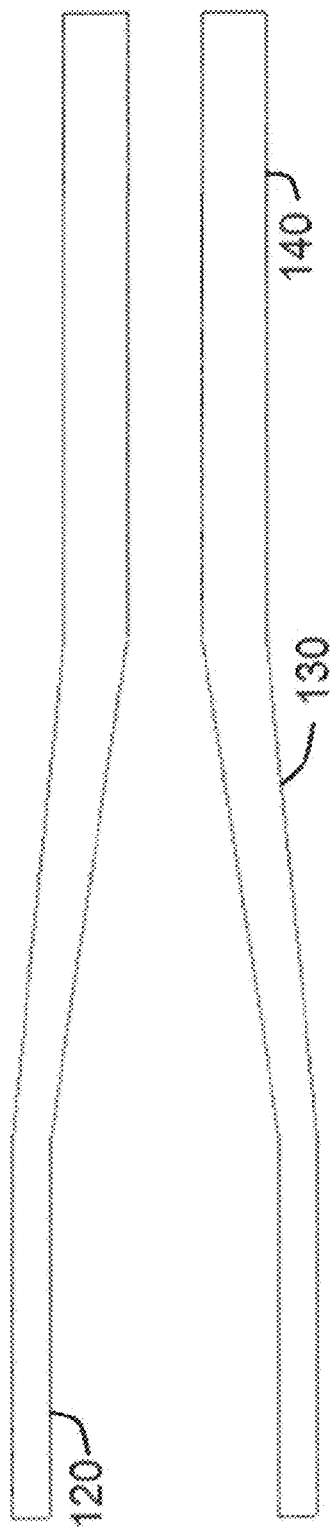
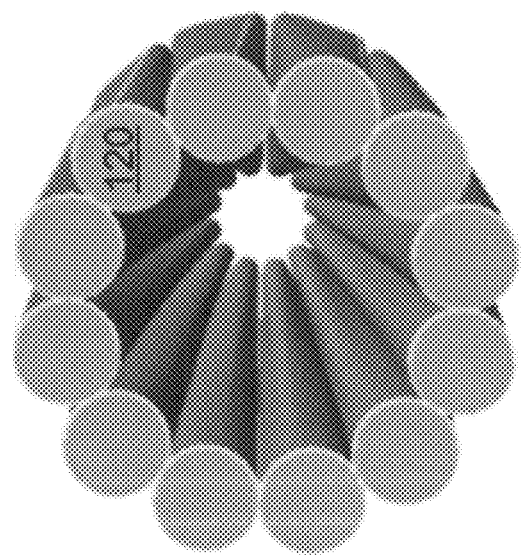
FIG. 1
FIG. 2
FIG. 3

OPTICAL COMBINER

BACKGROUND

Field of the Disclosure

The present disclosure relates generally to waveguides and, more particularly, to optical waveguides.

Description of Related Art

Optical devices for high power applications often invoke some manner of dimensional scale-down of the optical waveguide boundaries, for the purpose of concentrating or combining power into a smaller fiber guide. For example, a tapered fiber bundle forms a composite waveguide of fused fibers, which is then tapered to reduce its diameter. Unfortunately, this tapering results in an increase of the numerical aperture (NA) of the beam. Thus, in order to prevent loss of light in these types of tapered waveguides, the NA of the light at an input must be sufficiently small that any eventual increase in the NA does not exceed a critical angle and the waveguide maintains total internal reflection.

SUMMARY

The present disclosure provides a waveguide comprising an un-tapered end and a tapered end, which results in a progressively-varying cross-section from the un-tapered end to the tapered end. This progressively-varying cross-section produces a corresponding variation in a numerical aperture (NA) of light propagating through the waveguide.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 is a side view of one embodiment of an optical combiner.

FIG. 2 is a drawing showing one embodiment of an un-tapered end of the optical combiner of FIG. 1.

FIG. 3 is a drawing showing one embodiment of a tapered end of the optical combiner of FIG. 1.

DETAILED DESCRIPTION OF THE EMBODIMENTS

Optical waveguides are described by two orthogonal dimensions which govern the behavior of its allowed mode orders. For example, optical fibers are cylindrical with dimensional coordinates of radius r and azimuthal angle φ. Discrete $LP_{mn}$ modes describe particular orders for both dimensions, which may be viewed as transverse path lengths forming sequential multiples of $2\pi$. As a fiber's cross-sectional area is reduced (as through tapering along its length), the radial dimension decreases and a given mode transforms to having a larger radial wave vector or numerical aperture (NA).

Tapered fiber bundles provide a mechanism for concentrating optical power in high-power applications. Unfortunately, the tapering of the waveguide results in an increase in numerical aperture (NA) of propagating light as the cross-sectional area of the waveguide decreases. Consequently, even when light enters the waveguide at an angle that is within the acceptance cone at the larger cross-sectional area, the increase in NA can result in the light escaping the waveguide as it travels to the smaller cross-sectional area of the waveguide. Thus, in order to avoid this type of loss, light must enter the waveguide at an entrance angle that ensures containment of the light even when the NA increases as the light propagates from larger cross-sectional area to smaller cross-sectional area.

The disclosed embodiments show a waveguide structure in which the NA of a beam (e.g., collection of modes that are sustained in the waveguide) is reduced as it propagates along the waveguide. Thus, the waveguide permits propagation of the beam without the beam escaping from the waveguide. In one embodiment, the waveguide comprises an un-tapered end and a tapered end. Significantly, the shape of the waveguide changes from the input end to the output end in such a way that the effective cross sectional area does not decrease along the waveguide. By employing this type of waveguide as an optical combiner, light can be concentrated with minimal loss from the beam escaping from the waveguide. Although ring combiners (such as those shown in U.S. patent application Ser. No. 14/206,828, by Holland, filed on 2014 Mar. 12, having the title "Ring Combiner" (hereafter, "the '828 application"), which is incorporated herein by reference as if expressly set forth in its entirety) also employ tapered structures in which effective cross-sectional areas do not decrease along the taper, the disclosed embodiments provide for "pie" shapes at the tapered end, which improves brightness and provide for other advantages that are not readily realizable with prior ring combiners.

With this general overview in mind, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIG. 1 is a side view of one embodiment of an optical combiner, which has an un-tapered end 120, a tapered end 140, and a transition region 130. FIG. 2 shows one embodiment of the un-tapered end 120, while FIG. 3 shows one embodiment of the tapered end 140 along with a portion of the transition region 130.

As shown in FIG. 2, the un-tapered end 120 is arranged in a ring configuration. More specifically, FIG. 2 shows twelve (12) waveguides that are arranged adjacent to each other, such that the aggregate (or bundle of fibers) forms a ring pattern at the un-tapered end 120. Each of the un-tapered ends 120 has a substantially circular cross-sectional area, which permits fusion splicing of the un-tapered end 120 with another optical fiber to introduce light into the un-tapered end 120. As expected, the un-tapered end 120 permits introduction of light having a NA that is determined by Snell's Law.

As shown in FIG. 3, the tapered end 140 is also arranged in a ring configuration. However, unlike the un-tapered end 120, the each of the tapered ends 140 has a substantially pie-shaped cross-sectional area. As one can appreciate, each pie-shaped tapered end 140 corresponds to one of the circular un-tapered ends. Consequently, the transition region 130 has a cross-sectional area that progressively varies from the substantially circular cross-section (of the un-tapered end 120) to the substantially pie-shaped cross section (of the tapered end 140). In some embodiments, the pie-shaped cross-sections are fused together so that they form a single, ring-shaped output. For example, fusing together the tapered ends 140 in FIG. 3 would produce a 12-by-1 (12×1) taper, with twelve (12) circular cross-section un-tapered inputs converging to a single ring-shaped output. It should be appreciated that the number of inputs can be changed to create a 10×1 taper, a 19×1 taper, etc. When fused, light that reaches the tapered end 140 has a NA that may be different from the NA of the light at the un-tapered end 120 due to differences in the geometric configuration between the tapered end 140 and the un-tapered end 120. Depending on the optical application, the NA of the light at the tapered end 140 may be approximately the same as the NA of the light at the un-tapered end 120. Alternatively, the NA of the light at the un-tapered end 120 may be larger than the NA of the light at the tapered end 140.

It should be appreciated that, for some embodiments, all of the fibers in the bundle produce a uniform change in NA. In other words, in some embodiments, all of the fibers behave similarly, thereby resulting in similar behavior of light as it propagates through each of the waveguides.

Since modal characteristics of light in the embodiment of FIGS. 1 through 3 are analogous to the modal characteristics of light in the Ring Combiner of the '828 application, further discussions of those modal characteristics are omitted here. With this in mind, mathematical relations can be derived, allowing for designs based on target parameters such as input wall thickness, magnitude of NA decrease, output diameter, etc. Thus, as those skilled in the art will appreciate, the waveguide can be designed so that the NA of the light varies progressively along the length of the waveguide, going from a higher NA to a lower NA. For other embodiments, the waveguide can be designed so that the NA of the light remains relatively constant along the length of the waveguide. It should be noted that the transition region 130 produces light of varying NA that progressively varies from the un-tapered end 120 to the tapered end 140. One advantage of the embodiment shown in FIGS. 1 through 3 is that a large-aspect transition to a pie-shaped cross-section improves brightness.

The structures of FIGS. 1 through 3 can be used in numerous different applications. For example, one application for the structure of FIG. 1 is combining pump light from a large number of diode sources into a common fiber containing a low NA beam. Normally, the beam NA from fiber pigtailed diodes is in the range of approximately 0.12 to approximately 0.22. A configuration similar to that of FIG. 1 can be used to increase the number of combined diodes by first forming a circular arrangement of input fibers to match the un-tapered end 120 of the waveguide. A simple calculation reveals that with sources first combined in the conventional way to increase the light NA to approximately 0.40, the waveguide of FIG. 1 can be used to transmute the light into a beam or smaller fiber with a lower NA of approximately 0.15. Alternatively, if the waveguide is structured so that there is not an appreciable change in light NA between the input and the output, then a lower NA input beam can be used. In yet another embodiment, the waveguide can be further tapered so that an input beam with a 0.15 NA will decrease as it reaches the taper 130, and then increase back to 0.15 NA as it propagates through the taper 130.

The embodiment of FIG. 1 can also be used for pumping fiber lasers. For those types of applications, high NA pump light is launched into a double-clad fiber. This can be done by preceding and following the waveguide of FIG. 1 by a normal NA-increasing combining operation, which would yield an output fiber with high NA light that is suitable for coupling directly into a double-clad fiber. Those having ordinary skill in the art will appreciate that the embodiments of FIGS. 1 through 3 can be used in optical applications that are similar to those set forth in the '828 application (Ring Combiners). Consequently, further discussions of those optical applications are omitted here. However, it is worthwhile to note, again, that the un-tapered end 120 can be either an input end or an output end, depending on the desired application and, correspondingly, the tapered end 140 can be either an output end or an input end, depending on the desired application. Furthermore, it should be appreciated that the total cross-sectional area can be maintained relatively constant as the optical waveguide transitions from the un-tapered end 120 to the tapered end 140.

As shown herein, by using this type of tapered waveguide (FIGS. 1 through 3), light can be concentrated with minimal loss due to the beam escaping from the waveguide. This permits the use of the tapered waveguide (FIGS. 1 through 3) in numerous different optics-related applications.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. An apparatus comprising:
   an un-tapered end;
   a tapered end arranged in a ring configuration; and
   waveguides extending from the un-tapered end to the tapered end, each waveguide comprising:
      a substantially circular cross-sectional area at the un-tapered end;
      a substantially pie-shaped cross-sectional area at the tapered end; and
      a transition region located between the un-tapered end and the tapered end, the transition region having a cross-sectional area that progressively varies from the substantially circular cross-sectional area to the substantially pie-shaped cross-sectional area, the progressively-varying cross-sectional area for correspondingly varying light from a first numerical aperture (NA) to a second NA.

2. An apparatus, comprising:
   un-tapered ends;
   tapered ends corresponding to the un-tapered ends, the tapered ends being arranged in a ring configuration; and
   transition regions, each transition region being located between its corresponding un-tapered end and its corresponding tapered end, each transition region for progressively-varying light from a first numerical aperture (NA) to a second NA.

3. The apparatus of claim 2, the un-tapered ends being inputs, the tapered ends being outputs.

4. The apparatus of claim 2, each transition region progressively transitioning from a substantially circular cross-section to a substantially pie-shaped cross-section.

5. The apparatus of claim 4, the substantially pie-shaped cross sections being fused together.

6. The apparatus of claim 2, the un-tapered end having a first cross-sectional area, the tapered end having a second cross-sectional area, the first cross-sectional area being approximately the same as the second cross-sectional area.

7. The apparatus of claim 2, the first NA being greater than the second NA.

8. The apparatus of claim 2, the first NA being approximately the same as the second NA.

9. An apparatus, comprising:
   an un-tapered end;
   a tapered end being arranged in a ring configuration; and
   a transition region between the un-tapered end and the tapered end, the transition region for progressively-varying light from a first numerical aperture (NA) to a second NA.

10. The apparatus of claim 9, the un-tapered end being an input, the tapered end being an output.

11. The apparatus of claim 9, the un-tapered end being an output, the tapered end being an input.

12. The apparatus of claim 9, the transition region progressively transitioning from a substantially circular cross-section to a substantially pie-shaped cross-section.

13. The apparatus of claim 9, the un-tapered end having a first cross-sectional area, the tapered end having a second cross-sectional area, the first cross-sectional area being approximately the same as the second cross-sectional area.

14. The apparatus of claim 9, the first NA being greater than the second NA.

15. The apparatus of claim 9, the first NA being approximately the same as the second NA.

\* \* \* \* \*